W. C. LOCKWOOD.
TELEPHONE.
APPLICATION FILED JAN. 29, 1909. RENEWED APR. 22, 1910.
989,856.
Patented Apr. 18, 1911.
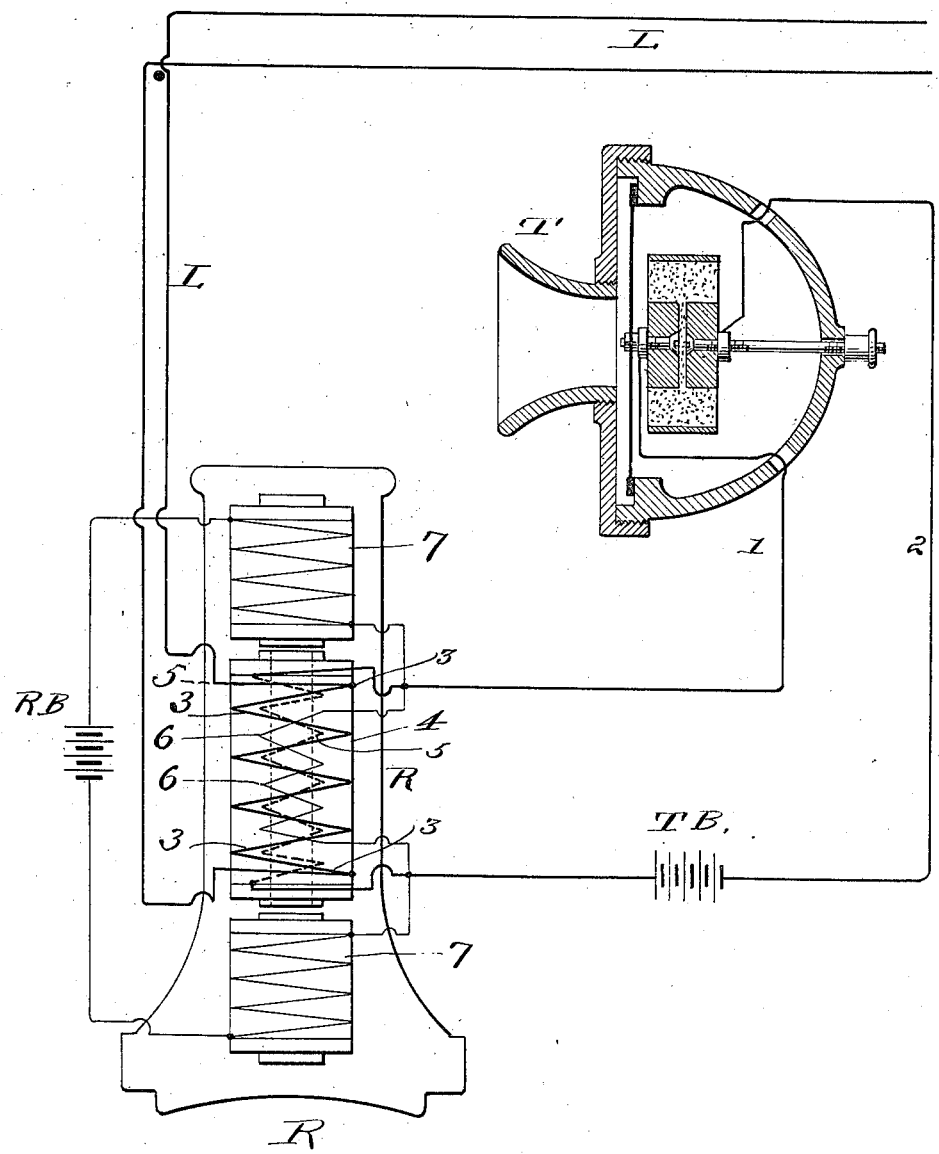

UNITED STATES PATENT OFFICE.

WILLIAM C. LOCKWOOD, OF SAN JUAN, PORTO RICO.

TELEPHONE.

989,856.  Specification of Letters Patent.  Patented Apr. 18, 1911.

Application filed January 29, 1909, Serial No. 475,078. Renewed April 22, 1910. Serial No. 557,077.

*To all whom it may concern:*

Be it known that I, WILLIAM C. LOCKWOOD, a citizen of the United States, residing at San Juan, in the Island of Porto Rico, have invented certain new and useful Improvements in Telephones, of which the following is a specification, reference being had therein to the accompanying drawing, which represents a diagrammatic view of one end of a telephone-circuit, showing the transmitter, receiver, and the local batteries.

The main object of this invention is to provide means for sending a magnetic induced current as well as a purely electrically induced current over the line in response to vibrations in the transmitter diaphragm.

Another object of the invention is to provide a coil with a double primary winding and maintaining a closed circuit through one of said windings, and a variable circuit through the other of said double windings, the line being connected to the secondary winding.

Other objects of the invention will appear hereinafter.

Referring to the drawing, T designates the transmitter and R the receiver.

L designates the line; T—B the transmitter battery; and R—B the receiver battery.

The transmitter may be of any desired form, but I have shown it constructed substantially in accordance with Patent No. 557,588, dated April 7, 1896, granted to W. C. and J. M. Lockwood. The terminals 1 and 2 of the transmitter circuit lead to the local transmitter battery through the primary coils of an induction coil 4 mounted in the receiver. In all other respects the transmitter may be of any ordinary and desirable construction. The transmitter circuit is normally open, impulses of current or variations of current being sent through it by reason of the vibration of the transmitter diaphragm.

The receiver consists of the central induction coil 4 having the single secondary winding 3, and a double primary winding 5 and 6. Adjacent the poles of the core of the induction coil 4 are arranged electromagnets 7, said magnets being axially in line with said core. The poles of the magnets are arranged close to the ends of the core of the induction coil, as shown in the drawing. The coils of the magnets are directly connected to the primary coil 6 and to the local receiver battery in a closed circuit so that a constant current is maintained through the magnets 7 and through the primary coil 6. One of the electromagnets is arranged with one of its poles adjacent the receiver diaphragm. The transmitter battery circuit is connected to the primary winding 5. The main line wires are connected to the secondary winding of the induction coil. The coils of the magnet 7 and the primary winding 6 are connected to the transmitter battery whereby the variations in the transmitter current will vary the current in the magnet 7 and in both primary windings. Because of the closed local circuit through the coils of the magnet 7 and through the primary windings 6 of an induction coil the self-inductance of these coils will be overcome and the variation of current through said coils, or the impulses of current sent through them because of the vibrations of the transmitter diaphragm, will instantly set up induced currents in the line.

It is obvious that there will not be the drag in the induced current in this form of apparatus as there would be if there were no closed local circuit through the coils of the magnet 7 and the primary winding 6 of the induction coil. It will also be observed that I secure by means of the magnet 7 an induced magnetic current in the line, as well as securing a strong induced current by reason of the double primary windings of the induction coil.

It will be noted that as the waves of induced current travel through the secondary winding 3 of the receiver at the adjacent end of the line they will vary the electromagnetic force of the magnets 7 and thereby correspondingly vibrate the receiver diaphragm.

Having thus described my invention, what I claim as new and desire to secure by Letters Patent is:—

1. A telephone system comprising a transmitter, a circuit therefor, a receiver provided with an induction coil having a double primary winding and a single secondary winding, an electromagnet adjacent each end of the core of said induction coil, a closed local circuit connected to the coils of the magnets and to one of the primary windings of the induction coil through the magnet coils, the magnet coils and the connected primary winding being also connected to the transmitter circuit, the second primary winding of the induction coil being also connected with the transmitter circuit, the line wire being connected to the secondary winding of the induction coil.

2. A telephone system comprising a receiver provided with an induction coil having a double primary winding and a single secondary winding, means for maintaining a closed local circuit through one of the primary windings, a transmitter, a transmitter circuit connected to the other primary winding and line wires connected to the secondary winding of the said induction coil.

3. A telephone system comprising a transmitter, a circuit therefor, an induction coil formed with a double primary winding and a single secondary winding, an electromagnet adjacent each end of the core of said induction coil, one of the primary windings of the induction coil being connected to the transmitter circuit and the coils of the electromagnets being also in the transmitter circuit, the line being connected to the secondary winding of the induction coil, and a local circuit connected to the other primary winding of the induction coil.

4. A telephone circuit provided with an induction coil having a double primary winding and a single secondary winding, means for maintaining a closed local circuit through one of the primary windings, a transmitter, a transmitter circuit connected to the other primary winding, and line wires connected to the secondary winding of the induction coil.

5. A telephone system comprising a transmitter, a circuit therefor, an induction coil having a double primary winding and a single secondary winding, an electromagnet adjacent each end of the core of said induction coil, one of the primary windings of the induction coil being connected to the transmitter circuit, a local circuit connected to the other primary winding of the induction coil, line wires connected to the secondary winding of the induction coil, and means for variably energizing the electromagnets.

6. A telephone system comprising a transmitter, a circuit therefor, an induction coil having a double primary winding and a single secondary winding, an electromagnet adjacent each end of the core of said induction coil, one of the primary windings of the induction coil being connected to the transmitter circuit, a local circuit connected to the other primary winding of the induction coil, line wires connected to the secondary winding of the induction coil, and means for energizing the electromagnets.

7. A telephone system comprising a transmitter, a circuit therefor, an induction coil formed with a primary winding and a secondary winding, an electromagnet adjacent each end of the core of said induction coil, the primary winding of the induction coil being connected to the transmitter circuit and the coils of the electromagnets being also in the transmitter circuit, the line being connected to the secondary winding of the induction coil.

8. A telephone system comprising a transmitter, a circuit therefor, an induction coil, an electromagnet adjacent each end of the core of said induction coil, the primary winding of the induction coil being connected to the transmitter circuit, line wires connected to the secondary winding of the induction coil, and means for variably energizing the electromagnets.

9. A telephone circuit provided with an induction coil having a double primary winding and a single secondary winding, an electromagnet adjacent each end of the core of said induction coil, the windings of the said electromagnets being connected to one of the primary windings of the induction coil and the other primary winding of said coil being in the transmitter circuit, the secondary winding of the said induction coil being connected to the line.

In testimony whereof I hereunto affix my signature in the presence of two witnesses this 4th day of January 1909.

WM. C. LOCKWOOD.

Witnesses:
 JUAN M. SAINZ,
 JOHANNES RICHARD.